US009924156B2

(12) United States Patent
Barnes

(10) Patent No.: US 9,924,156 B2
(45) Date of Patent: *Mar. 20, 2018

(54) STEREO PANORAMIC IMAGES

(71) Applicant: HERE Global B.V., Eindhoven (NL)

(72) Inventor: Craig Barnes, Forest Park, IL (US)

(73) Assignee: HERE Global B.V., Eindhoven (NL)

(\*) Notice: Subject to any disclaimer, the term of this patent is extended or adjusted under 35 U.S.C. 154(b) by 0 days.

This patent is subject to a terminal disclaimer.

(21) Appl. No.: 14/943,581

(22) Filed: Nov. 17, 2015

(65) Prior Publication Data
US 2016/0080725 A1 Mar. 17, 2016

Related U.S. Application Data

(63) Continuation of application No. 13/755,683, filed on Jan. 31, 2013, now Pat. No. 9,215,448.

(51) Int. Cl.
*H04N 7/00* (2011.01)
*H04N 13/02* (2006.01)
(Continued)

(52) U.S. Cl.
CPC ........... *H04N 13/026* (2013.01); *G01C 21/26* (2013.01); *H04N 5/23238* (2013.01);
(Continued)

(58) Field of Classification Search
USPC ........ 348/36, 37, 39, 43, 46, 47, 48, 49, 51, 348/52, 53, 264, 55, 60, 77, 78, 119, 135,
(Continued)

(56) References Cited

U.S. PATENT DOCUMENTS 5,099,317 A \* 3/1992 Takemura ............... H04N 9/045
348/264
5,917,656 A \* 6/1999 Hayakawa ......... G02B 17/0816
250/494.1
(Continued)

FOREIGN PATENT DOCUMENTS

WO WO2012136388 10/2012

OTHER PUBLICATIONS

Ruigang Yang et al., View-Dependent Textured Splatting, 2006, Center for Visualization and Virtual Environment, Lexington, KY.
(Continued)

*Primary Examiner* — Jefferey F Harold
*Assistant Examiner* — Mustafizur Rahman
(74) *Attorney, Agent, or Firm* — Alston & Bird LLP

(57) ABSTRACT

In one embodiment, range data is combined with an image in order to create a stereo image from the single collected image. An apparatus receives image data associated with a geographic location and range data associated with the geographic location. The range data may be a point cloud. At least one perspective image is formed based on the image data and the range data. The perspective image has a viewpoint different than single collected image. The apparatus generates a stereo image from the at least one perspective image. The stereo image appears to have depth. The at least one perspective image may include two images, each offset by a distance to estimate eye separation.

20 Claims, 11 Drawing Sheets

(51) Int. Cl.
  *H04N 13/00* (2018.01)
  *G01C 21/26* (2006.01)
  *H04N 5/232* (2006.01)

(52) U.S. Cl.
  CPC ..... *H04N 5/23293* (2013.01); *H04N 13/0022* (2013.01); *H04N 13/025* (2013.01); *H04N 13/0207* (2013.01); *H04N 13/0257* (2013.01); *H04N 2013/0077* (2013.01); *H04N 2013/0088* (2013.01)

(58) Field of Classification Search
  USPC .............. 348/139, 140, 148, 149, 290, 719; 382/117, 118, 154, 171, 173, 305; 701/23, 533, 26, 28, 400, 408, 409, 410, 701/411, 454, 460, 523
  See application file for complete search history.

(56) References Cited

U.S. PATENT DOCUMENTS

| | | | |
|---|---|---|---|
| 5,949,409 A * | 9/1999 | Tanaka | G06T 11/001 345/549 |
| 6,021,374 A | 2/2000 | Wood | |
| 6,031,564 A | 2/2000 | Ma et al. | |
| 6,092,008 A * | 7/2000 | Bateman | G07C 5/008 244/1 R |
| 6,181,805 B1 | 1/2001 | Koike et al. | |
| 8,032,126 B2 | 10/2011 | Fraccaroli | |
| 8,098,934 B2 | 1/2012 | Vincent et al. | |
| 8,553,942 B2 | 10/2013 | Lynch | |
| 8,754,929 B1 * | 6/2014 | Prince | H04N 13/0022 348/47 |
| 8,908,041 B2 * | 12/2014 | Stein | G06K 9/00791 348/148 |
| 2002/0101506 A1 | 8/2002 | Suzuki | |
| 2002/0159636 A1 * | 10/2002 | Lienhart | G06K 9/325 382/176 |
| 2003/0105586 A1 | 6/2003 | Arai et al. | |
| 2004/0001138 A1 * | 1/2004 | Weerashinghe | H04N 13/0242 348/36 |
| 2004/0207759 A1 * | 10/2004 | Li | H04N 5/20 348/674 |
| 2005/0078190 A1 * | 4/2005 | Bloom | H04N 1/32112 348/207.99 |
| 2005/0078369 A1 * | 4/2005 | Blanchard | G02B 27/26 359/462 |
| 2005/0111753 A1 | 5/2005 | Peleg et al. | |
| 2005/0190443 A1 * | 9/2005 | Nam | G02B 27/2214 359/464 |
| 2006/0137736 A1 | 6/2006 | Nishitani et al. | |
| 2007/0081744 A1 * | 4/2007 | Gokturk | G06F 17/30253 382/305 |
| 2007/0198951 A1 | 8/2007 | Frank | |
| 2008/0032677 A1 | 2/2008 | Catovic et al. | |
| 2008/0183382 A1 * | 7/2008 | Asai | G01C 21/20 701/414 |
| 2008/0278574 A1 * | 11/2008 | Ramstad | H04N 13/0431 348/51 |
| 2008/0303893 A1 * | 12/2008 | Kim | H04N 13/0022 348/42 |
| 2009/0262125 A1 | 10/2009 | Swaminathan et al. | |
| 2009/0325607 A1 | 12/2009 | Conway et al. | |
| 2010/0246954 A1 * | 9/2010 | Kim | G06K 9/3233 382/170 |
| 2011/0050859 A1 | 3/2011 | Kimmel et al. | |
| 2011/0115615 A1 | 5/2011 | Luo et al. | |
| 2011/0141240 A1 * | 6/2011 | Dutta | H04N 13/0022 348/47 |
| 2011/0222757 A1 | 9/2011 | Yeatman, Jr. et al. | |
| 2011/0227910 A1 * | 9/2011 | Ying | A61B 6/032 345/419 |
| 2011/0261158 A1 * | 10/2011 | Suh | H04N 13/0059 348/43 |
| 2011/0267433 A1 | 11/2011 | Thorpe et al. | |
| 2011/0313874 A1 | 12/2011 | Hardie et al. | |
| 2012/0027267 A1 * | 2/2012 | Kim | G06F 3/0418 382/118 |
| 2012/0033077 A1 | 2/2012 | Kitaura et al. | |
| 2012/0056899 A1 * | 3/2012 | Stroila | G01C 21/32 345/634 |
| 2012/0158300 A1 * | 6/2012 | Kim | G01C 21/3664 701/533 |
| 2012/0274625 A1 | 11/2012 | Lynch | |
| 2012/0294145 A1 * | 11/2012 | Steudle | H04L 47/14 370/230 |
| 2012/0294532 A1 * | 11/2012 | Morris | G06F 17/30241 382/195 |
| 2012/0311131 A1 | 12/2012 | Arrasvuori | |
| 2013/0063560 A1 * | 3/2013 | Roberts | G06F 3/011 348/46 |
| 2013/0169668 A1 * | 7/2013 | Lynch | G01C 21/3638 345/619 |
| 2013/0188017 A1 * | 7/2013 | Ma | G06T 7/0018 348/46 |
| 2013/0321407 A1 * | 12/2013 | Jenkins | G01V 1/345 345/419 |
| 2014/0085296 A1 * | 3/2014 | Baik | H04N 13/0033 345/419 |
| 2014/0125780 A1 * | 5/2014 | Suh | H04N 13/0048 348/51 |
| 2014/0229861 A1 * | 8/2014 | Hellstrom | H04L 65/403 715/753 |

OTHER PUBLICATIONS

Shmuel Peleg et al., Omnistereo: Panoramic Stereo Imaging, Mar. 2001, vol. 23, No. 3, IEEE Transactions on Pattern Analysis and Machine Intelligence.

Office Action for U.S. Appl. No. 13/755,683 dated Apr. 13, 2015, 41 pages.

Notice of Allowance for U.S. Appl. No. 13/755,683 dated Aug. 19, 2015, 10 pages.

\* cited by examiner

STEREO PANORAMIC IMAGES

This application is a continuation of U.S. patent application Ser. No. 13/755,683 filed Jan. 31, 2013, the disclosures of all of which are incorporated herein by reference in their entirety.

FIELD

The following disclosure relates to stereo panoramic images, or more particularly, to stereo images in navigation-related and/or mapping-related applications.

BACKGROUND

Panoramic images have an elongated field of view. Panoramic images may be generated using a camera that rotates around a viewpoint. The panoramic image is taken over time as the camera rotates. In the case of film cameras, a motorized mechanism rotates the camera continuously and pulls the film through the camera, so the motion of the film matches that of the image movement across the image plane. Digital rotating line cameras image a panorama line by line as the camera rotates.

One limitation of a rotating camera is that moving objects cannot be imaged. A moving object in the field of view of the camera appears distorted. If the moving object is in the background of the panoramic image, the moving object appears blurry. If the moving object is near the foreground of the panoramic image, the moving object may appear as a long streak or blurred object. Another limitation of a rotating camera is that the rotating camera may not collect clear images from a moving location. Thus, rotating cameras may not collect clear images from a motor vehicle.

Stereo images create or enhance the illusion of depth in a flat image using two images designed to simulate the perception of depth based on how the human eyes process an image. Two adjacent cameras may be used to collect stereo images. However, in the case of stereo panoramic images, a pair of rotating cameras may not generate desirable stereo images because the cameras may also image each other, disrupting the panoramic images.

SUMMARY

In one embodiment, range data is combined with an image in order to create a stereo image from the single collected image. An apparatus receives image data associated with a geographic location and range data associated with the geographic location. The range data may be a point cloud. At least one perspective image is formed based on the image data and the range data. The perspective image has a viewpoint different than single collected image. The apparatus generates a stereo image from the at least one perspective image. The stereo image appears to have depth. The at least one perspective image may include two images, each offset by a distance to estimate eye separation.

BRIEF DESCRIPTION OF THE DRAWINGS

Exemplary embodiments of the present disclosure are described herein with reference to the following drawings.

DETAILED DESCRIPTION

A camera and a range finding device may be mounted in a known relationship to each other. The camera may be configured to collect a wide angle image. A wide angle image has a field of view greater than that of the human eye. The range finding device is configured to collect distance data and optionally intensity data for objects and features in the vicinity of the data collection vehicle. The wide angle image and the distance data are combined to create a resultant image that can be manipulated by a computer. The resultant image may be manipulated to appear as if the resultant image was taken from a location different than the location of the camera.

A left perspective image from a perspective to the left of the camera and a right perspective image from a perspective to the right of the camera may be generated. The left perspective image and the right perspective image may be combined to form a stereo image. Thus, the stereo image is created using a single camera rather than a pair of cameras. Further, the stereo image can be created from data collected by the single camera and the range finding device, which are not significantly distorted if collected from a moving platform (e.g., a vehicle) or if objects in the image are moving. The stereo image may be a stereoscopic image, an anaglyph, or another three-dimensional type of image. The stereoscopic image is viewable with 3D glasses or other specialized viewing equipment.

The following embodiments relate to a method and system for generating or presenting stereo panoramic images. The panoramic images may be street side imagery similar to photographs collected from a camera at street level. The panoramic images may be used in a rendering of a geographic area or a model or representation of a portion of the Earth and objects on the surface of the Earth. Examples of three-dimensional renderings of a geographic area are available as part of services such as Google Earth, Nokia 3D Maps, Nokia Drive, Bing Maps Platform (formerly, Microsoft Virtual Earth). Examples of street side imagery may be included in Google Maps, Nokia HERE Maps, Bing Maps, iOS Maps, or other applications. When combined with or representing street side imagery, stereo panoramic images may provide users with an immersive experience to remotely explore street level features.

Figure 1:
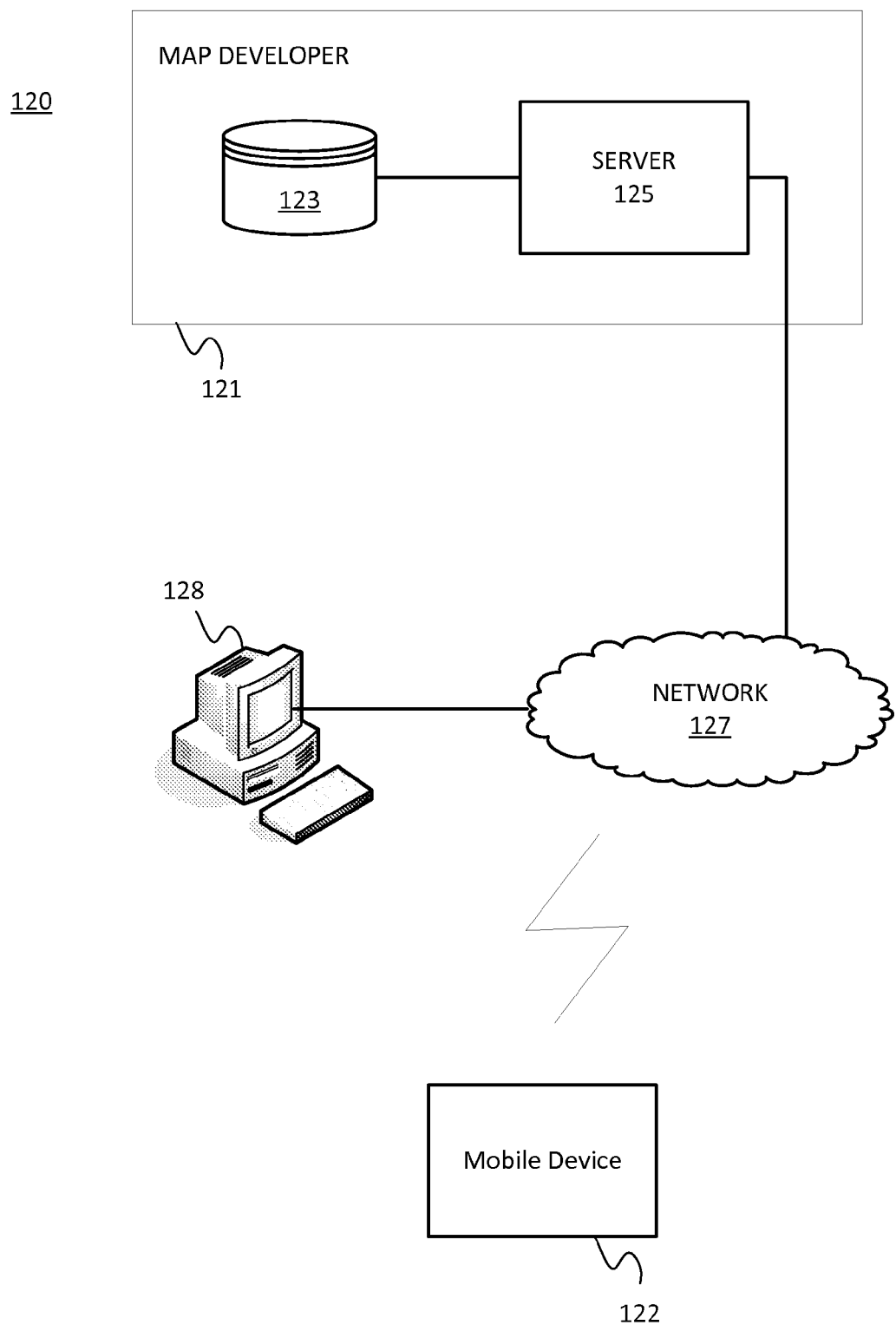
FIG. 1 illustrates an example system for generating stereo panoramic images.

FIG. 1 illustrates an exemplary system 120 for generating stereo images. The system 120 includes a map developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. As another example, no mobile devices 122 or no workstations 128 connect with the network 127.

The computing resources necessary for generating stereo street side imagery may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In additional embodiments, the processing is divided substantially evenly between the server 125 and the mobile device 122 or workstation 128 ("hybrid embodiments"). Any combination of processing burden between the server 125 and the mobile device 122 or workstation 128 may be used. As an example, the following initial discussion focuses on server-based embodiments.

The server 125 is configured to receive image data associated with a geographic location and range data associated with the geographic location. The image data is collected by a camera. Exactly one camera may be used to collect all of the image data that ultimately results in a stereo panoramic image. Multiple cameras may be used to capture image data used for a given stereo panoramic image in other embodiments.

The camera may be a stationary camera or a moving camera. Examples of rotating cameras include a swing lens camera and a rotation camera. A swing lens camera includes an objective lens that rotates to collect the image data. A rotation camera rotates about an axis or along a circular path. The camera may be a digital camera including a charge coupled device configured to capture images in a line by line process to generate the image data.

A stationary camera may be a wide field camera or a rotating lens camera. A wide field camera includes a wide angle lens that can image a wide angle. The wide angle may be 360 degrees or any angle greater than that of the human eye. The angle of the human eye may be any angle from 120 degrees to 180 degrees. The angle of view may be calculated on the basis of the focal length of the objective lens and the width of a film plane. A shorter focal length results in a wider field of view.

The range data may be collected with a range finding device. The range finding device may send a laser or other signal that reflects off objects in the geographic area around the range finding device. The range finding device may be a light detection and ranging (LIDAR) device configured to generate a point cloud. Each point in the cloud includes a three-dimensional location and, optionally, an intensity value. The range finding device may be located at substantially the same position as the camera. Alternatively, the location of the camera is known with respect to the range finding device and can be used to translation the image data into the frame of reference of the image data or vice versa.

The server 125 is configured to form one or more perspective images based on the image data and the range data. In one example, the image data is used to colorize the range data. For example, the server 125 selects a point in the point cloud generated from the range device. The server 125 identifies a pixel in the image data that corresponds to the selected point from the point cloud. The pixel may be the closest pixel on a projection of the image data onto the point cloud. Multiple point clouds, taken at different point in time, may be combined in order to fill in missing portions in the point cloud. The missing portions may be caused by interfering objects such as parked cars, driving cars, or vegetation. The resulting set of data includes both a three-dimensional location and pixel values for some or all points.

In another example, the server 125 textures an area of the point cloud. The server 125 identifies the area of the point cloud to be textured according to a predetermined size or the relative point density of the point cloud. The area may be a circle, a square, a rectangle or another shape. The area may be projected onto the surface of an image bubble including the image data. The area may be parallel or tangential to the surface of the image bubble. The area may be a plane perpendicular to the line of sight of the camera.

The server 125 is configured to change the viewpoint of the image from the combined image data and range data. The combined data may provide voxels representing surfaces in three-dimensions. The server 125 effectively moves the viewpoint of the image by rotating and/or scaling the colorized range data in the area. The server 125 may generate a left perspective view by moving the viewpoint of the image to the left and a right perspective view by moving the viewpoint of the image to the right.

The server 125 is configured to generate a stereo image from the left perspective view and the right perspective view. The left perspective may be spaced from the right perspective by an estimated eye separation distance from the point of view of the camera. Example estimated eye separation distances include 1 inch, 4 cm, 5 cm, 6 cm, or another distance. The viewpoint of each image is moved by one half of the estimated eye separation or one of the images is moved by the entire estimated eye separation. Other relative amounts of movement or offset may be used.

The stereo image may be a stereoscopic image comprising a first image offset from a second image. The stereoscopic image creates an illusion of depth when viewed using a stereoscope or another device that separates the field of view of the left eye from the field of view of the right eye. The stereo image may be an anaglyph including a first filtered image and a second filtered image. The first filtered image is filtered with a color (e.g., red) and the second filtered image is filtered with a chromatically opposite color (e.g., cyan). When viewed through anaglyph glasses, the anaglyph appears to have depth. The stereo image includes two perspectives but is derived from image data collected from a single location or a single device over time.

The server 125 may send the stereo image to the mobile device 122 for display to a user. The mobile device 122 is a smart phone, a mobile phone, a personal digital assistant ("PDA"), a tablet computer, a notebook computer, a personal navigation device ("PND"), a portable navigation device, and/or any other known or later developed portable or mobile device. The mobile device 122 includes one or more detectors or sensors as a positioning system built or embedded into or within the interior of the mobile device 122. The mobile device 122 receives location data from the positioning system.

The optional workstation 128 is a general purpose computer including programming specialized for the following embodiments. The workstation 128 includes at least a memory, a processor, and a communication interface. For example, the workstation 128 is a personal computer, terminal, or other stationary computing platform.

The developer system 121 may include computer systems and networks of a system operator (e.g., NAVTEQ or Nokia Corp.). For example, the developer system 121 includes the database 123 and the server 125. Additional or different components may be provided, such as a distributed network of databases and associated servers for regional or redundant operation.

The developer system 121, the workstation 128, and the mobile device 122 are coupled with the network 127. The phrase "coupled with" includes directly connected to or indirectly connected through one or more intermediate components. Such intermediate components may include hardware and/or software-based components. The network 127 is a cellular, local area, wide area, Internet, or other network.

Figure 2A:
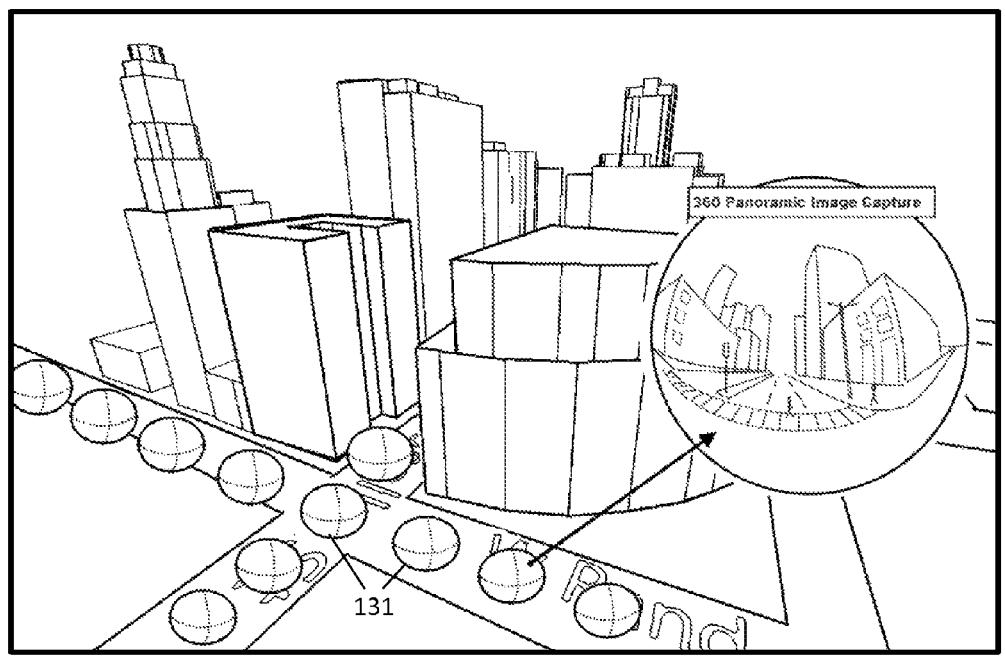
FIG. 2A illustrates example collection points for panoramic images and distance data.

FIG. 2A illustrates example collection points for panoramic images and distance data. The camera and the range finding device may be mounted in a data collection vehicle. The panoramic images may be image bubbles collected from the data collection vehicle. The image bubbles 131 may be collected at predetermined intervals along a street.

The image bubbles may have center points measured in Cartesian coordinates, such as an X-coordinate, a Y-coordinate, and a Z-coordinate. The images may have a world orientation defined in three rotation angles or a quaternion. Each point on the image bubble is defined by the center point and one or more angles (e.g., roll, pitch, and yaw). The camera may be mounted on a vehicle that moves along a street. The camera may collect an image bubble at regular time or distance intervals (e.g., 1 m, 5 m, 10 m, 1 second, 10 seconds, 100 milliseconds). The image bubbles are associated with the geographic location and orientation of the camera and/or vehicle at the time the image bubble is collected.

Figure 2B:
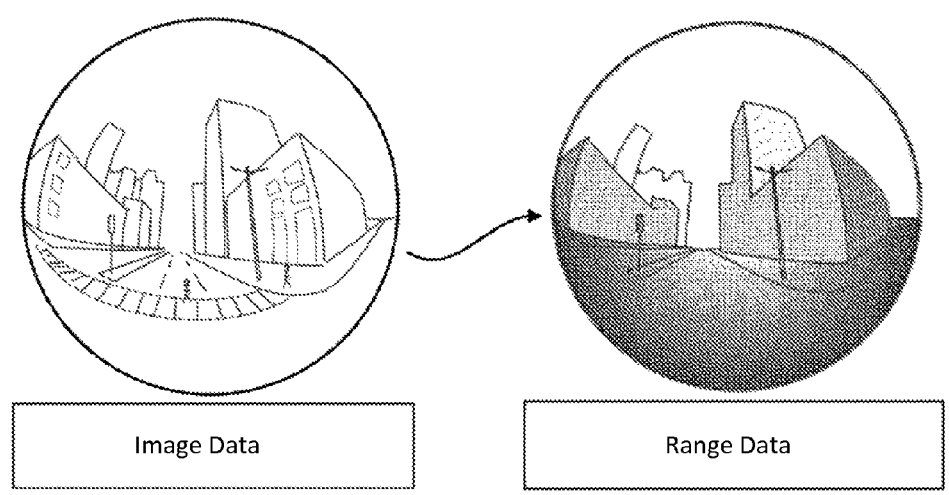
FIG. 2B illustrates an example correlation of the panoramic images and distance data.

FIG. 2B illustrates an example correlation of the panoramic images and range data. The range data may be collected at the same time or near the same time as the image data. The range data may be collected by a LIDAR device that collects and gathers data points in a point cloud. The data points may be matched with image bubbles based on location. The data points include location coordinates and an on or off value. An intensity value may be included in place of the on or off value. Alternatively, the data points may include a distance value and two angle values to signify a location of a point in the point cloud. The point cloud may be stored in ASCII or LIDAR exchange format. One or more lasers of the LiDAR device may be in a near infrared spectrum (such as about 700 nm to about 5000 nm or about 800 nm to about 2500 nm) or another light spectrum.

Figure 3:
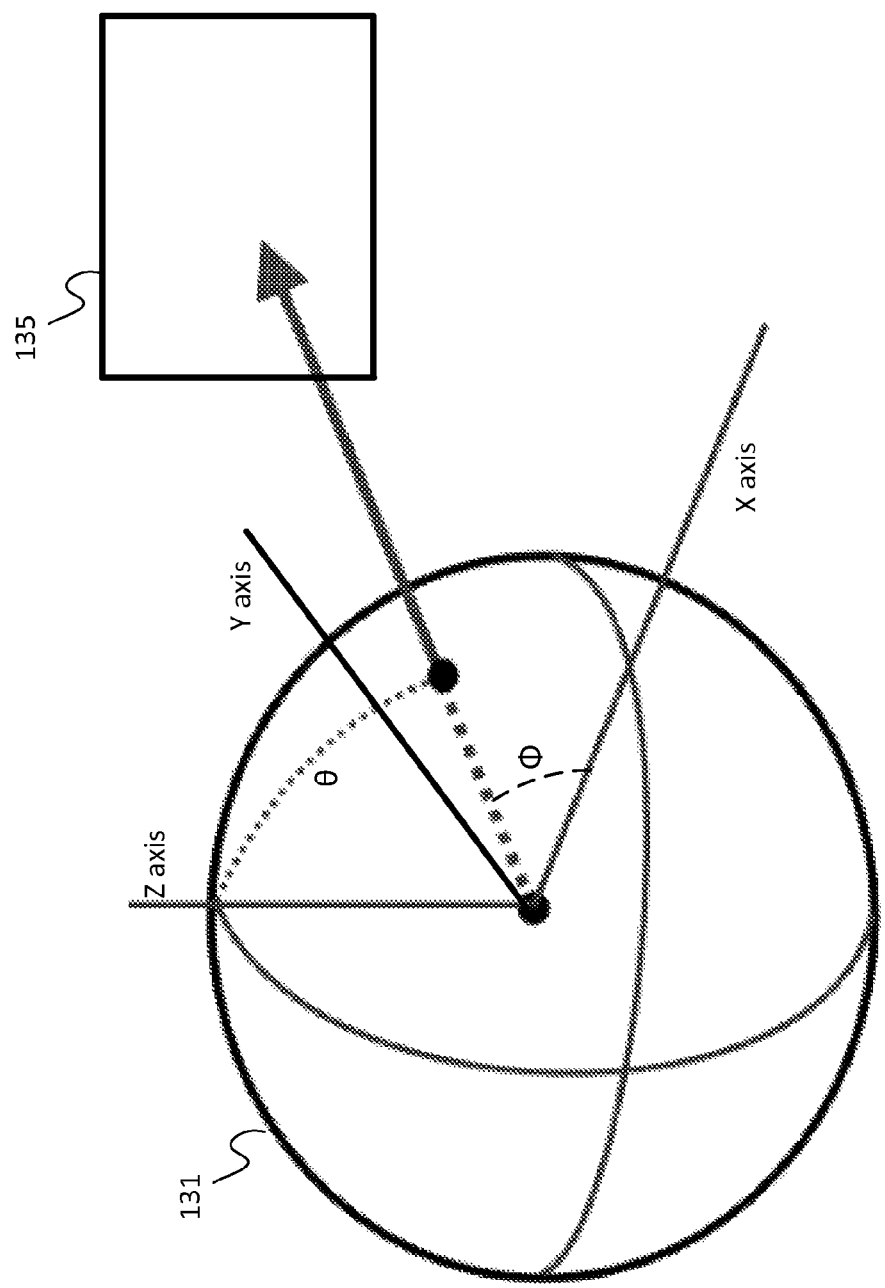
FIG. 3 illustrates an example combination of image data and distance data.

FIG. 3 illustrates an example combination of image data and distance data. The image bubble 131 includes the panoramic image as the surface of the sphere. Any point on the surface of the sphere may be described using a Cartesian axis, including the X axis, Y axis, and Z axis, or described using two or more angles (e.g., $\varphi$, and $\theta$), as shown in FIG. 3.

In order to combine the image data with the distance data, the colors in the image data are projected onto a viewpoint oriented quadrilateral 135 around each point in the point cloud. Each point in the point cloud has a three-dimensional position (X, Y, Z) or (latitude, longitude, altitude). Each point in the point cloud may be mapped to one or more panoramic images. Each point may be converted into a viewpoint oriented quadrilateral, which may be referred to as a splat, and faces a virtual camera located at the view position. As the view position changes, the virtual camera for the viewpoint oriented quadrilateral 135 changes. As the virtual camera moves, each splat is reoriented to track the position of the virtual camera. In one implementation, the viewpoint oriented quadrilateral 135 may be projected onto the surface of the image bubble 131 or in parallel (tangential) to the surface of the image bubble 131, but any sized viewpoint oriented quadrilateral 135 may be generated. The example of FIG. 3 is not shown to scale or any specific orientation.

The vertices of the viewpoint oriented quadrilateral 135 may be calculated using a unit sphere. Each point in the point cloud is surrounded by a unit sphere having a radius of 1. The coordinates of the point cloud are projected onto the unit sphere. Each vertex of the viewpoint oriented quadrilateral 135 is converted to spherical coordinates using Equations 1 and 2.

$$\theta = \cos^{-1} z \qquad \text{Eq. 1}$$

$$\varphi = \tan^{-1} \frac{y}{z} \qquad \text{Eq. 2}$$

The angles $\varphi$ and $\theta$ are used to compute the texture coordinates for the panoramic images. If one panoramic image is used, the panoramic image is effectively recreated into the frame of reference of the point cloud. Because the location of each pixel in the image is known or estimated from the point cloud, the subject matter of the panoramic image may be rendered from different viewpoints than the one from which the panoramic image was collected.

The viewpoint oriented quadrilateral 135 may be a quadrilateral centered around the point in the point cloud. The quadrilateral may be a rectangle or square. Alternatively, the sides of the quadrilateral may have different lengths or a circle or oval shape may be used instead of the quadrilateral. The size of the viewpoint oriented quadrilateral 135 is variable but may be at least large enough to extend to neighboring points in the point cloud to prevent holes in the resulting image. Examples sizes include 2 pixels, 3 pixels, and 10 pixels.

For example, the viewpoint oriented quadrilateral 135 may be calculated based on the location of neighboring points in the point cloud. The points in the point cloud may be projected to a surface of a sphere, such as a sphere sized equal to image bubble 131. The area around the point of interest is divided into a number of quadrants around the image bubble. The nearest point in each quadrant to the point of interest is identified. A center point along a line from the point of interest to the nearest point is calculated. The center points form the vertices of the viewpoint oriented quadrilateral 135. Other methods for calculating the viewpoint oriented quadrilateral 135 may be used. For example, the area 135 may be a percentage of a sphere or a number of degrees in arc length.

The viewpoint oriented quadrilateral 135 is colorized by painting, texturing or splatting colors from the image data onto the viewpoint oriented quadrilateral 135. Color information from multiple pixels in the image data is incorporated into each viewpoint oriented quadrilateral 135. In an alternative to calculating an area size for each point in the point cloud, the size of the image data used for each point may be predetermined. The predetermined size may be a number of pixels (e.g., 2 pixels, 10 pixels, or 100 pixels). Texturing or splatting techniques may be performed by a graphics processing unit (GPU). A portion of the image data may be copied to the viewpoint oriented quadrilateral 135.

The process for orienting and texturing the viewpoint oriented quadrilateral 135 may be repeated to import image data into the point cloud and form an image slice of the perspective image. The number of repetitions may depend on the sizes of the quadrilaterals or other shapes that are used. The number of repetitions may depend on the density of the point cloud because a quadrilateral may be textured for each point in the point cloud and the adjacent area. Once an image slice (e.g., a portion of a panoramic image) has been textured, the image slice is stored and the system moves to the next image slice. The process repeats until a configurable number of image slices has been textured or the entire panoramic image has been used.

Figure 4A:
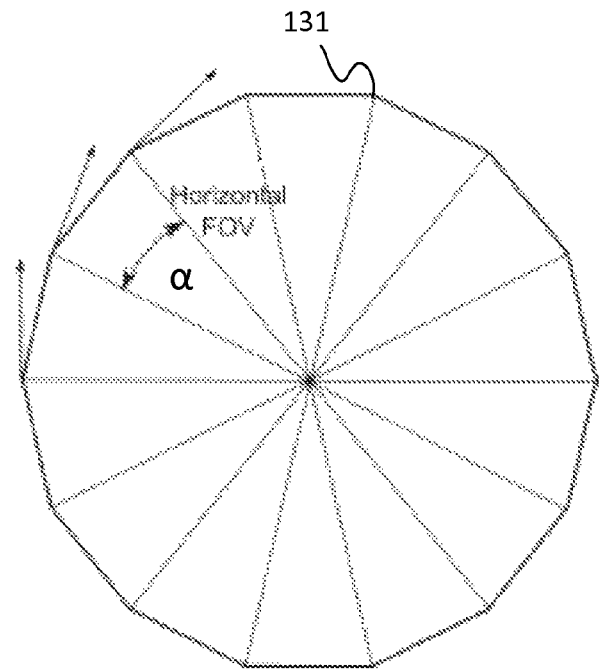
FIG. 4A illustrates an example arrangement of image slices for a perspective image.

FIG. 4A illustrates an example arrangement of image slices for a perspective image. The image slices are portions of the three-dimensional image bubble 131 projected onto a two-dimensional plane. Any number of image slices may be used. The number of image slices may be 360/α, where α is a number of degrees of the wedge shaped portion of the image bubble 131 used for the image slice. The value for α may be any number of radians or degrees. When α is 10, there are 36 image slices. As the number of image slices is higher, an amount of distortion caused by the projection of the three-dimensional image bubble onto a two-dimensional plane is minimized.

Figure 4B:
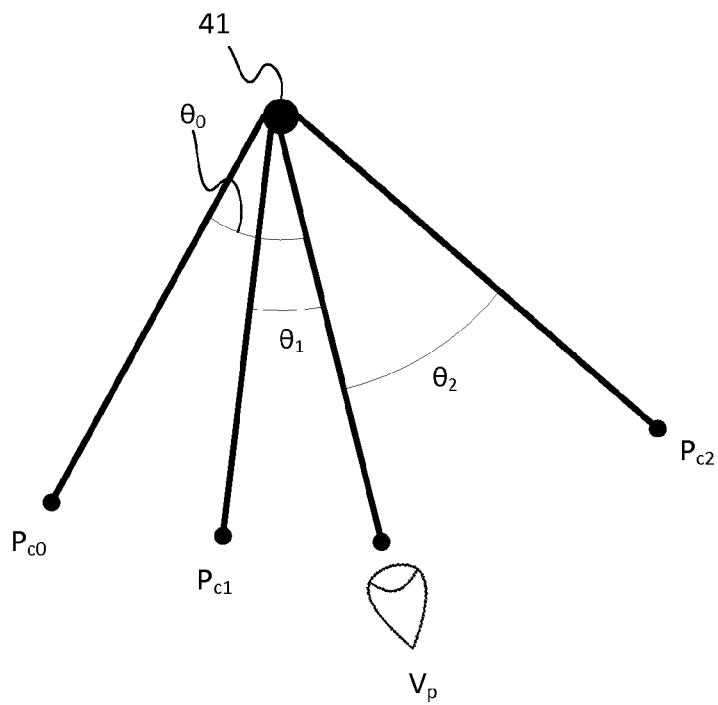
FIG. 4B illustrates an example calculation of coordinates for the perspective image of FIG. 4A.

FIG. 4B illustrates an example calculation of texture coordinates for the perspective image of FIG. 4A. The perspective image may be textured from a single panoramic image or multiple panoramic image. Multiple panoramic images may be used when the viewpoint oriented quadrilateral 135 is not substantially aligned with a single panoramic image. Multiple panoramic images or data of multiple image bubbles may be combined when texturizing the viewpoint oriented quadrilateral 135 for the perspective image. A configurable number of panoramic images may be used. The panoramic images may include all images that are within a predetermined distance to from the viewing point of view $V_p$. The example of FIG. 4B includes three panoramic images. Point 41 is a point in the viewpoint oriented quadrilateral 135 that was included in three panoramic images. An angle to each of the corresponding points of the panoramic images is calculated. The angle to the point $P_{c0}$ of a first panoramic image is $\theta_0$, the angle to the point $P_{c1}$ of a first panoramic image is $\theta_1$, and the point $P_{c2}$ of a first panoramic image is $\theta_2$. Each of the points $P_{c0}$, $P_{c1}$, and $P_{c2}$ correspond to point 41 but have different viewpoints and are located at a different location within the respective panoramic images. The image data or pixel values for the points $P_{c0}$, $P_{c1}$, and $P_{c2}$ may be averaged or otherwise combined in order to determine the value for the point 41 in the perspective image. Other weighted averaging or interpolation techniques may be used.

Figure 5:
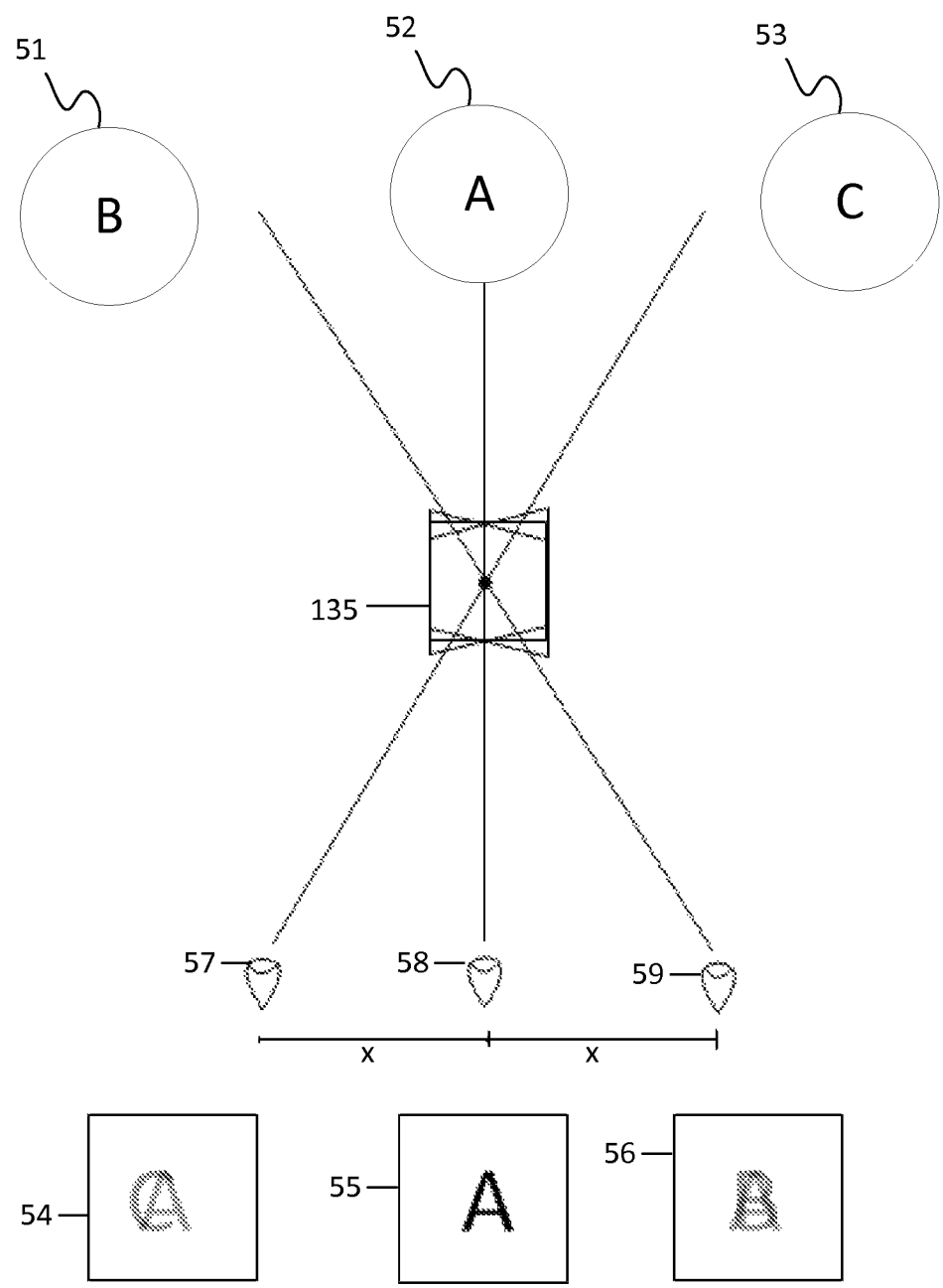
FIG. 5 illustrates an interpolation technique for the perspective image of FIG. 4A.

FIG. 5 illustrates an interpolation technique for combining the panoramic images to create the perspective image of FIG. 4A. In this example, three panoramic images are combined in the calculation of the pixel values for the viewpoint oriented quadrilateral 135. FIG. 5 illustrates image portions 51, 52, and 53 as portions of the respective panoramic images that align with the same point in the viewpoint oriented quadrilateral 135.

An original viewpoint 58 substantially overlaps with camera position and orientation used to collect the panoramic image including the image portion 52. Therefore, image 55 includes data from image portion 52 without alteration. However, viewpoints 57 and 59 do not substantially overlap with the camera position and orientation of any available panoramic images. Adjacent panoramic images are combined, averaged, or interpolated in order to calculate images 54 and 56. Pixel values in images 54 and 56 are combinations of the nearest two panoramic images. More than two nearby panoramic images may be used. For example, all panoramic images include the subject matter of the same point in the viewpoint oriented quadrilateral 135. Or, a predetermined number (e.g., 3, 5, or 10) of panoramic images may be combined. The panoramic images may be the set of panoramic images that intersect the viewpoint oriented quadrilateral 135.

In one implementation, a blending weight is calculated in order to combine the panoramic images. The blending weight is used to morph the color values between one view position and the other by blending the sum contributions of all colors of the panoramic images closest to the current view position. Each final pixel is colored by summing the contribution of a set of N images closest to the current viewing position. This set is referred to as the current working set.

The interpolation techniques illustrated in FIG. 5 may be used to calculate images from any location and perspective even when no image data has been collected from that location and/or perspective. In one example, the distance "x" between viewpoints 57 and 58 and between viewpoints 58 and 59 corresponds to half of the eye separation distance of a viewer. The distance between viewpoints 57 and 59 corresponds to the full eye separation distance. The eye separation may be estimated or calculated. When the perspective images generated by the interpolation technique are separated by the eye separation distance, the perspective images may be combined to form a stereo image.

In one implementation, angles between the current position of the virtual camera and the selected panoramic images are computed and used to assign a weight $w_i$. FIG. 4B illustrates the angles $\theta_i$ between the virtual camera and the selected panoramic images. Equation 3 defines the weights as a function of the angles $\theta_i$ and a sizing factor σ. The sizing factor may be varied to control the width of the blending window size. The sizing factor may be between 0 and 1.

$$w_i = e^{\left(-\frac{\theta_i^2}{\sigma^2}\right)} \quad \text{Eq. 3}$$

Multiple blending weights are computed for each image. The final pixel values or final color ($f_c$) for the image is computed using Equation 4 as a function of the pixel value ($c_i$) of the original panoramic images and the associated weights.

$$f_c = \frac{\sum_{i=0}^{N} c_i w_i}{\sum_{i=1}^{N} w_i} \quad \text{Eq. 4}$$

Figure 6:
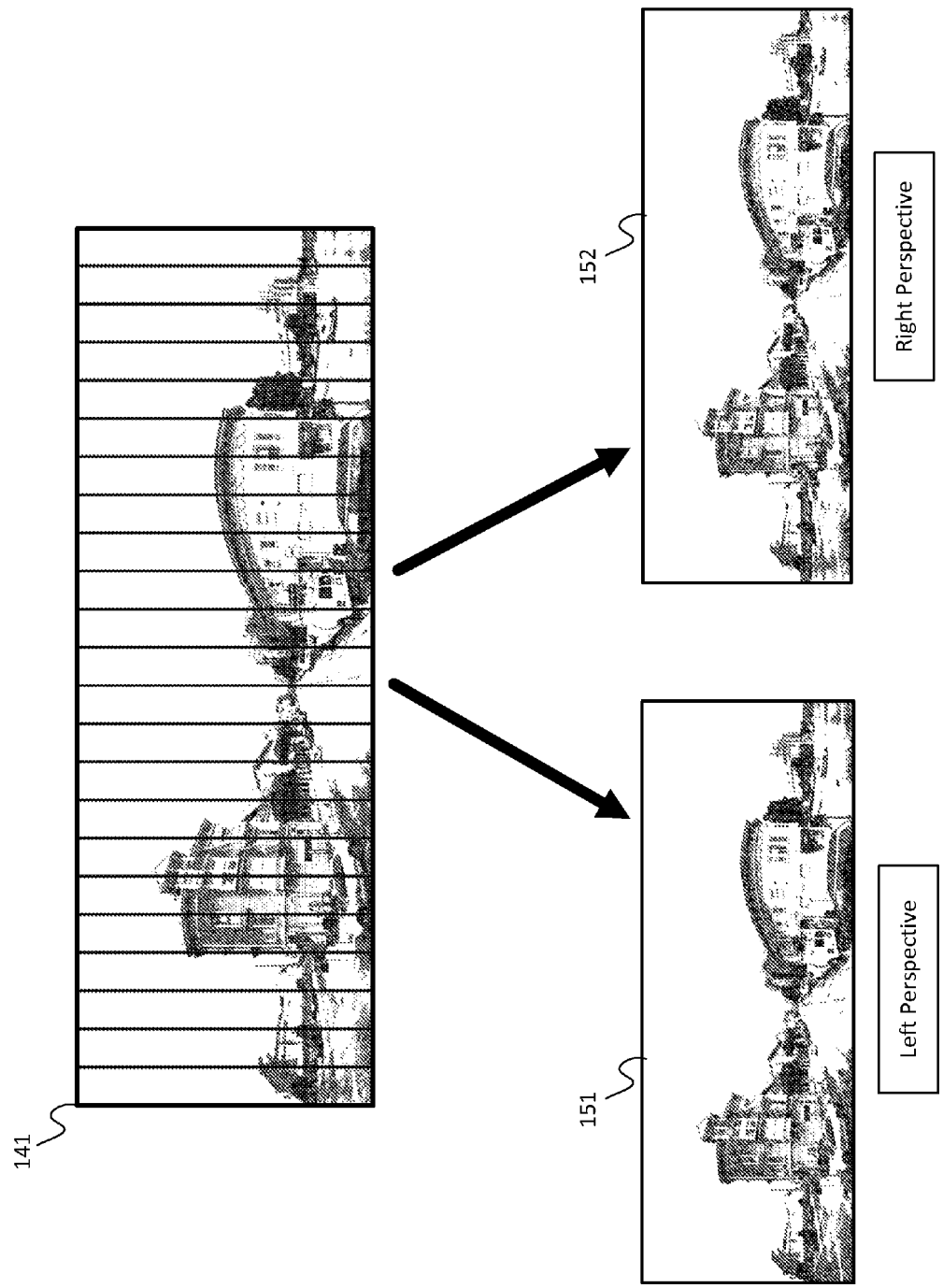
FIG. 6 illustrates example perspective images from the arrangement of image slices in FIG. 4A.

FIG. 6 illustrates an example perspective image 141 from the arrangement of image slices in FIG. 4A. The perspective image 141 is illustrated with lines separating image slices for purposes of illustration only. The perspective image 141 may be generated by sampling the image data of the image bubble 131. The data for each image slice is determined by changing the viewpoint of a virtual camera when colorizing, texturing, or interpolating image data from multiple panoramic images using the three dimensional location of the subject matter of the panoramic images. The three dimensional locations are determined based on range data (e.g., LIDAR).

Figure 7:
FIG. 7 illustrates an example stereo image derived from the perspective images of FIG. 6.

In one embodiment, two perspective images are generated using the interpolation technique above. A left perspective image 151 is generated by moving the viewpoint by half of the eye separation distance to the left, and a right perspective image 152 is generated by moving the viewpoint by half of the eye separation distance to the right. FIG. 7 illustrates an example stereo image derived from the left perspective image and the right perspective of FIG. 6. The stereo image may be a stereoscopic image, an anaglyph, or another three dimensional image.

Figure 8:
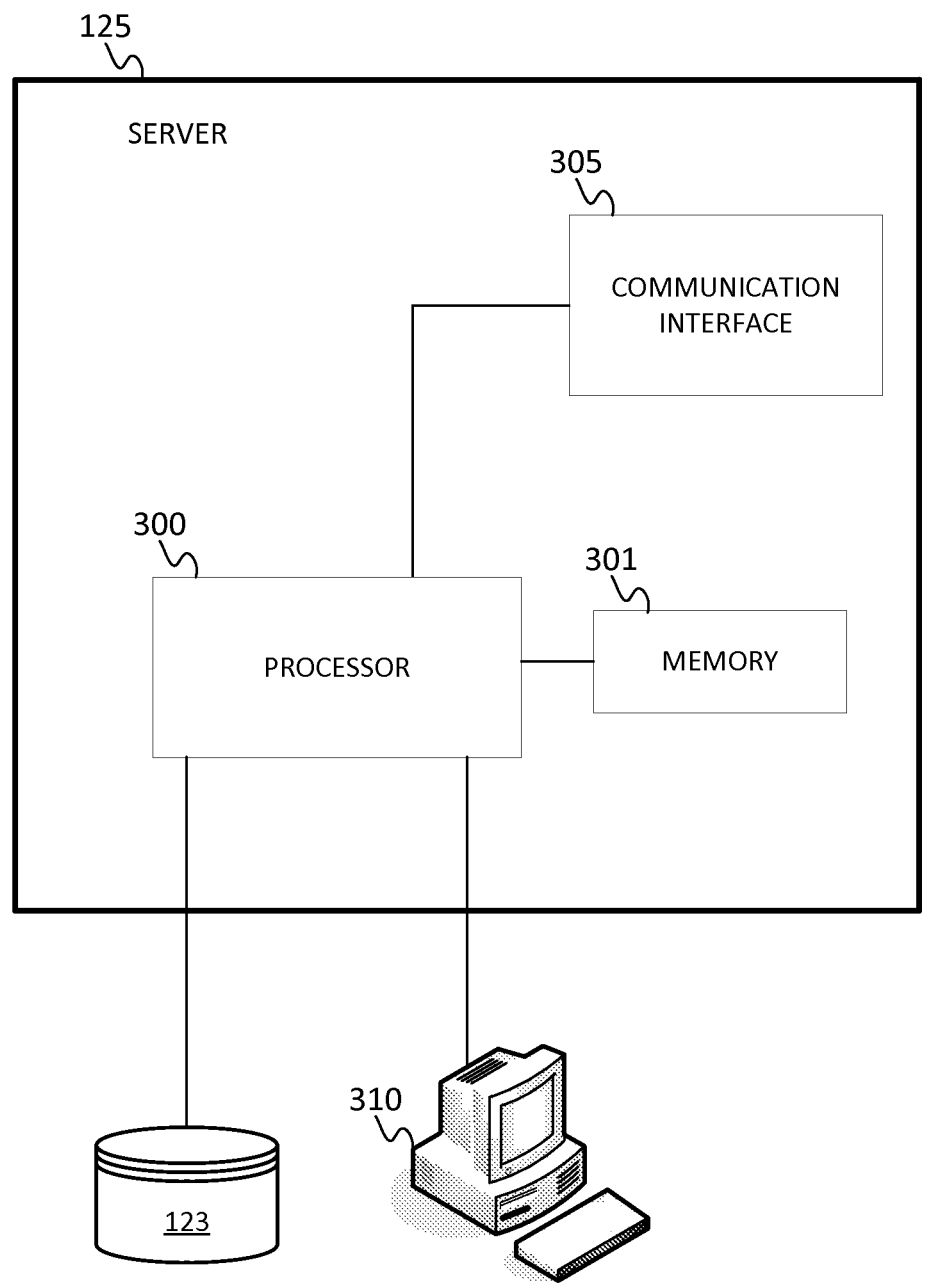
FIG. 8 illustrates an exemplary server of the system of FIG. 1.

FIG. 8 illustrates an exemplary server of the system of FIG. 1. The server 125 is configured to generate stereo images with a viewpoint different than that of the camera used to collect the original image data. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of user inputs made via the workstation 128 or the mobile device 122.

Figure 9:
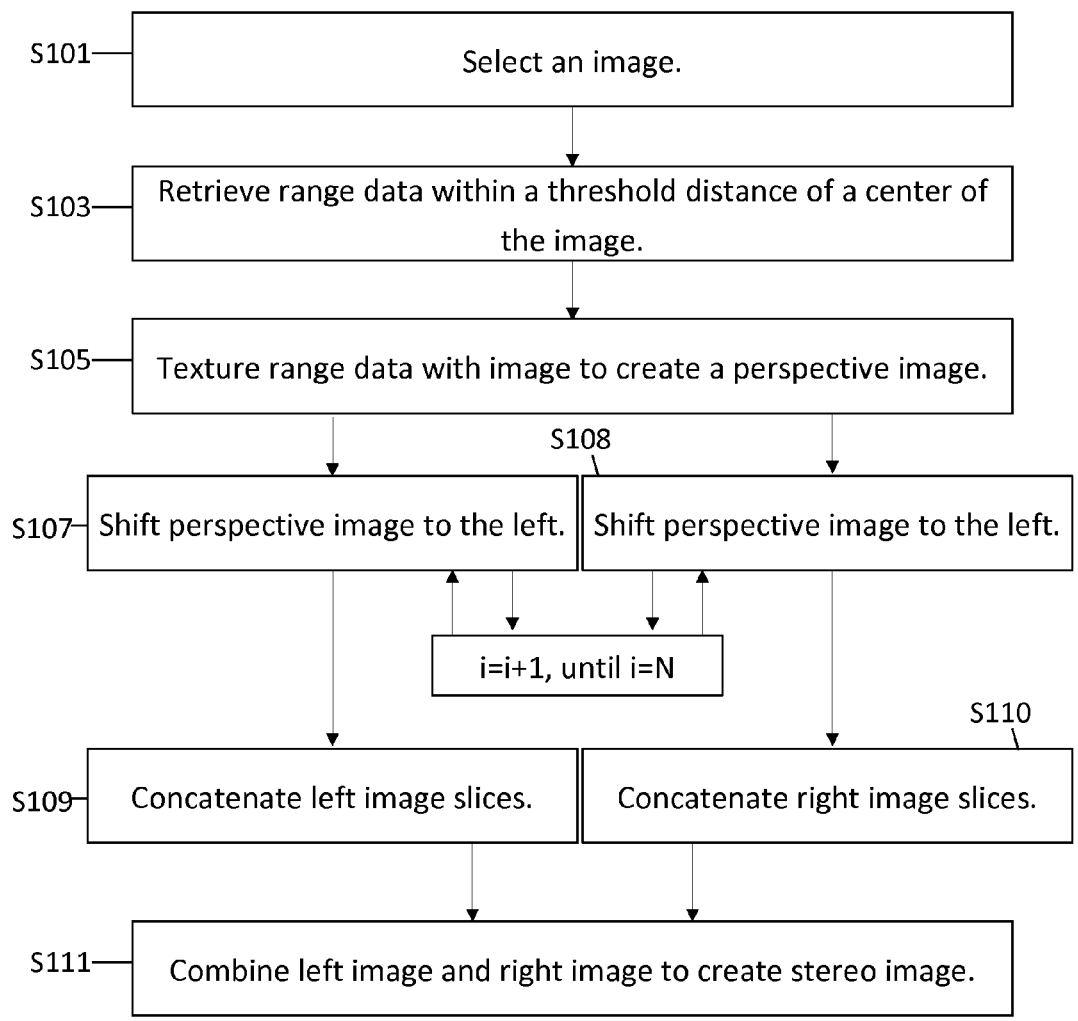
FIG. 9 illustrates an example flowchart for generating stereo panoramic images.

FIG. 9 illustrates an example flowchart for formation of stereo images that appear to be viewed form at least one different viewpoint than the viewpoint used to collect the images, which is described in relation to the server 125 but may be performed by another device, such as the mobile device 122. Additional, different, or fewer acts may be provided.

At act S101, the processor 300 selects an image and loads the image along with the pose of the image. The pose of the image includes a location of the center of the image or a location of the collection point for the image, as well as an orientation of the image. In one example, the pose of the image includes a latitude value, a longitude value, an altitude value, and a heading value. The image may be a panoramic image including a field of view greater than that of the human eye.

At act S103, the processor 300 queries the database 123 using the pose of the image or at least the location of the center of the image. The database 123 returns range data within a threshold distance of the center of the image. The threshold distance may be 10 meters, 100 meters, or another distance. The threshold distance may depend on the interval or frequency with which the images were collected. The range data may include one or more point clouds collected using a range finding device. The relationship between images is derived from the range data and may be used to manipulate images or combine images.

At act S105, the processor 300 textures the range data using one or more images. The processor 300 may be configured to convert each point in the range data to an area that faces a virtual camera, as shown in FIG. 4A. For example, the processor 300 may be configured to rotate, translate, or scale the area to face a specified location and orientation. The area may be colorized using a corresponding pixel value (color, brightness, and/or hue) from the closest panoramic image. Multiple color components may be used for each pixel value.

In addition or in the alternative, the area may be textured using multiple pixels from the closest panoramic image. A portion of the closest panoramic image is used to texture around the area. One example technique for texturing uses a geometry shader to generate graphics primitives in the area and a fragment shader to add color and other attributes of the image fragment. The size of the portion of the closest panoramic image may be sized to extend to neighboring points in the point cloud to prevent holes in the resulting image. The ratio between the size of the portion of the closest panoramic image and the area being textured may be configurable depending on the size of the panoramic image and the desired resulting image. Example ratios include 1:1, 1:2, and 3:1.

At acts S107 and S108, the processor 300 generates two perspective images. The perspective images are created by offsetting the virtual camera to the left and to the right. The processor selects a field of view, which may be any number of degrees. The virtual camera is rotated and/or translated in the space to render an image slice (i) from 1 to K. Each position of the image camera is i*360/K. As an alternative to shifting the camera to the left and to the right by half the eye separation distance, the camera may be shifted only once in either direction by the full eye separation distance.

At act S109, the image slices for the left shift are concatenated to form the left perspective image, and the image slices for the right shift are concatenated to form the right perspective image. At act S111, the processor 300 combines the left perspective image and the right perspective image to create a stereo image. The left perspective image and the right perspective image may be overlaid to create the stereo image. Through viewing with a specialized device, the stereo image creates the illusion of three dimensions in a two dimensional image. The specialized device may be 3D glasses. Alternatively, the left perspective image may be displayed adjacent to the right perspective image and the specialized device is a stereoscopic viewer that separates the field of vision of the human eyes such that the left eye views only the left perspective image and the right eye views only the right perspective image. Timing based stereo display may be used, where the left and right views are displayed in sequence synchronous with shutters worn by the user over each eye.

Figure 10:
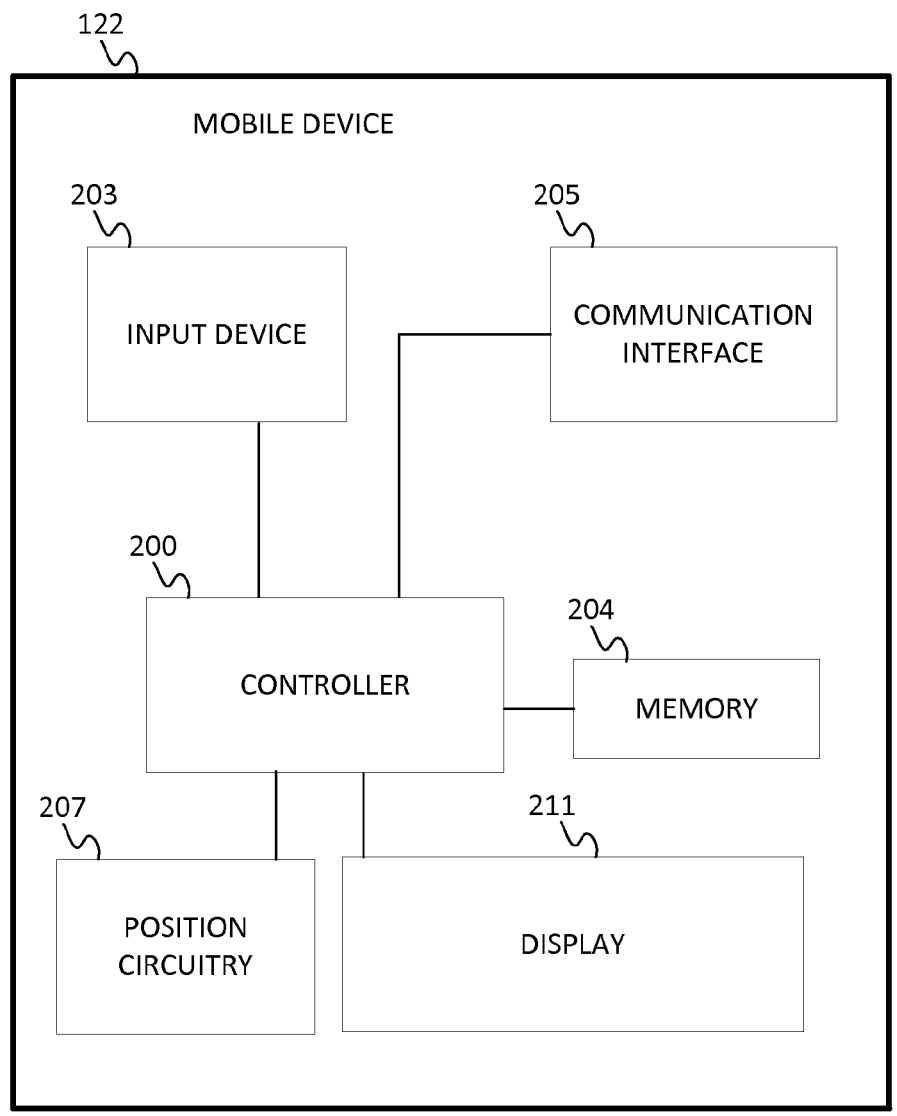
FIG. 10 illustrates an exemplary mobile device of the system of FIG. 1.

FIG. 10 illustrates an exemplary mobile device of the system of FIG. 1. The mobile device 122 may be referred to as a navigation device. The mobile device 122 includes a controller 200, a memory 201, an input device 203, a communication interface 205, position circuitry 207, a camera 209, and a display 211. The workstation 128 may include at least a memory and processor and may be substituted for the mobile device in the following endpoint-based embodiments. In the following endpoint-based embodiments, the mobile device 122 or the workstation 128 performs a majority of the processing.

Figure 11:
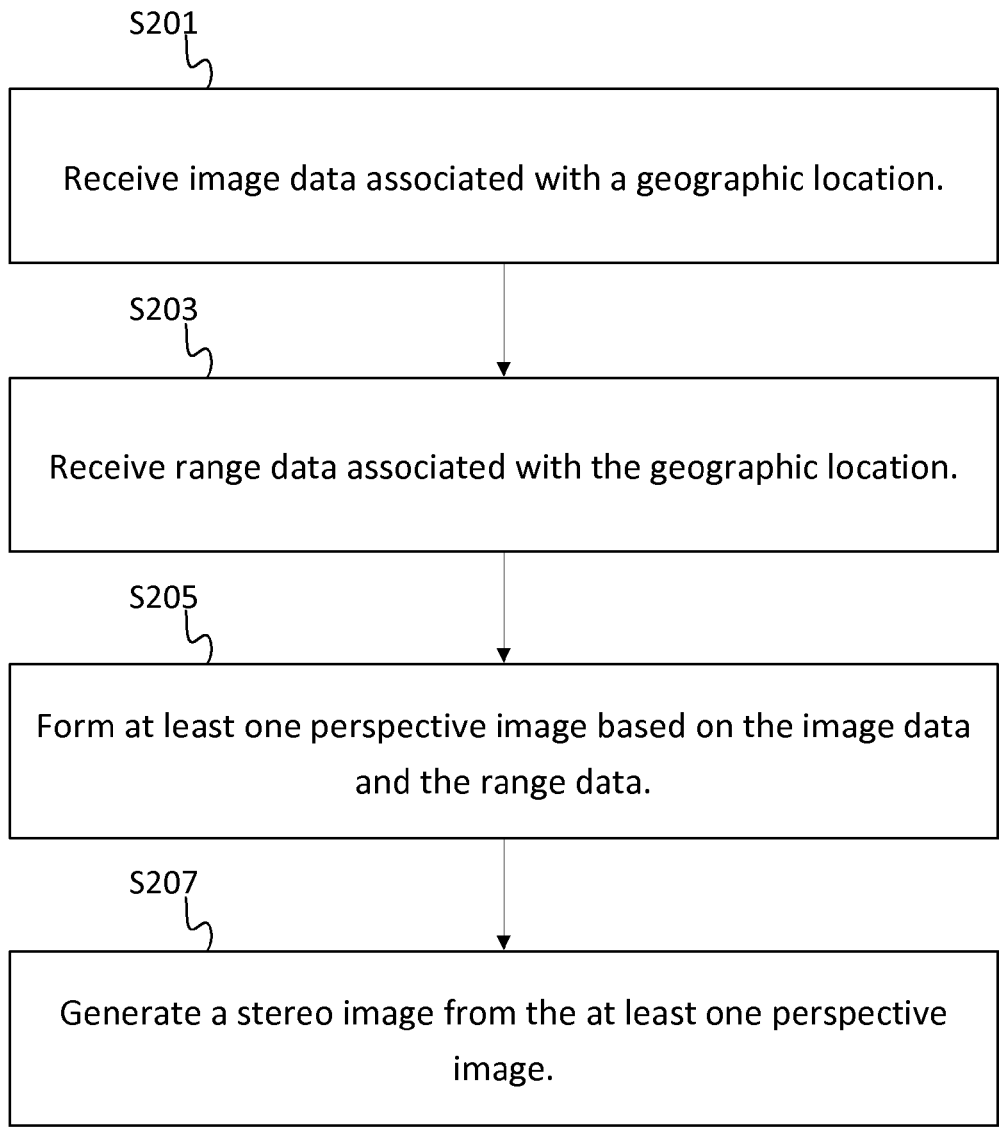
FIG. 11 illustrates another example flowchart for generating stereo panoramic images.

FIG. 11 illustrates an example flowchart for formation of stereo images that appear to be viewed form a different viewpoint than the viewpoint used to collect the images, which is described in relation to the mobile device 122 but may be performed by another device. Additional, different, or fewer acts may be provided.

At acts S201 and S203, image data and range data associated with a geographic location are received. The image data and the range data may be collected from the same or nearby locations. The image data and the range data may be collected at the same or different times. The range data may include multiple point clouds collected at different times. The image data and the range data may be received at the communication interface 205, received from stored locations in memory 201, or received from another device.

At act 205, the controller 200 is configured to form at least one perspective image based on the image data and the range data. The at least one perspective image may be one image with a slightly different perspective than the image data. The slightly different perspective may be set by moving the viewpoint a small distance (e.g., 2-3 centimeters) or rotating the viewpoint by a small angle (0-2 degrees). The perspective of the image data can be manipulated because the relative locations of all the pixels in the image are known from the range data. The at least one perspective may include two perspectives each slightly different than the perspective of the image data.

At act S207, the controller 200 is configured to generate a stereo image from the at least one perspective image. The stereo image may be generated as a stereo image formed from a left perspective image and a right perspective image. The left perspective image and the right perspective image may be formed from the three-dimensional location data textured by color information from the two-dimensional image. The controller 200 is configured to calculate a texturing area around a point in the three-dimensional location data and import color information from a plurality of pixels in the two-dimensional image into the texturing area.

The input device 203 is configured to receive a selection for a map-related feature or a navigation-related feature. The selection may be a point of interest, a destination, or any address. In response to the selection, the navigation-related application provides routing instruction to a user including the stereo image. The selection may be an address or a directional movement for the map-related feature. The mapping-related application may display the stereo image in response to the selection. The display 211 is configured to display the stereo image as part of a navigation application or mapping application.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The mobile device 122 is configured to identify a stereo image associated with the location data and display the stereo image in response to the location data.

The database 123 of the system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The navigation-related features may include a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The mapping-related features may be any of the navigation-related features provided to the user without reference to the current location of the user or the device. In addition, map-related features may include display and manipulation of a map of a geographic region. The map-related features may be provided without navigation-related features.

The database 123 may also store image bubbles and three-dimensional renderings of geographic regions. The road segments may be tied to the image bubbles and renderings of geographic regions. The mobile device 122 or workstation 128 may receive an input from a user to select a point along a route or on a map to display a portion of an image bubble in combination with the rendering of the geographic region.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a micropro-cessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. An apparatus comprising:
   at least one processor; and
   at least one memory including computer program code for one or more programs, the at least one memory and the computer program code configured to, with the at least one processor, cause the apparatus to perform at least the following,
   receive a two-dimensional image associated with a geographic location;
   receive three-dimensional location data associated with the geographic location that describes distances to objects at the geographic location;
   form a left perspective image and a right perspective image from the three-dimensional location data by extraction of color information from the two-dimensional image and insertion of the color information in the three-dimensional location data; and
   generate a stereo image formed from the left perspective image and the right perspective image.

2. The apparatus of claim 1, wherein the left perspective image and the right perspective image are offset by an eye separation distance.

3. The apparatus of claim 2, wherein the eye separation distance is in the range of 0 to 2 degrees.

4. The apparatus of claim 1, wherein the stereo image is an anaglyph comprising a first filtered image and a second filtered image.

5. The apparatus of claim 1, wherein the at least one processor is configured to cause the apparatus to calculate a texturing area around a point in the three-dimensional location data and import color information from a plurality of pixels in the two-dimensional image into the texturing area.

6. The apparatus of claim 1, wherein no image data is collected from a viewpoint of the left perspective image or a viewpoint of the right perspective image.

7. The apparatus of claim 1, wherein the left perspective image and the right perspective image comprise multiple image projections.

8. The apparatus of claim 1, further comprising:
   a display configured to display the stereo image as part of a navigation application.

9. The apparatus of claim 1, wherein the stereo image is displayed in a map application for accessing street level images along a map.

10. The apparatus of claim 1, the at least one memory and the computer program code configured to, with the at least one processor, cause the apparatus to perform:
    identify a viewpoint oriented quadrilateral from a spherical image bubble, wherein the two-dimensional image is derived from the viewpoint oriented quadrilateral.

11. The apparatus of claim 1, wherein receive the two-dimensional image and the three-dimensional location data are collected at a same time.

12. A method comprising:
    receiving a two-dimensional image associated with a geographic location;
    receiving three-dimensional location data associated with the geographic location that describes distances to objects at the geographic location;
    forming a left perspective image and a right perspective image from the three-dimensional location data by extraction of color information from the two-dimensional image and insertion of the color information in the three-dimensional location data; and
    generating a stereo image formed from the left perspective image and the right perspective image.

13. The method of claim 12, wherein the left perspective image and the right perspective image are offset by an eye separation distance.

14. The method of claim 13, wherein the eye separation distance is in the range of 0 to 2 degrees.

15. The method of claim 12, wherein the stereo image is an anaglyph comprising a first filtered image and a second filtered image.

16. The method of claim 15, wherein the first filtered image corresponds to a first color filter and the second filtered image corresponds to a second color filter, wherein the first color filter is chromatically opposite to the second color filter.

17. The method of claim 12, further comprising:
    calculating a texturing area around a point in the three-dimensional location data; and
    importing color information from a plurality of pixels in the two-dimensional image into the texturing area.

18. The method of claim 12, wherein the stereo image is displayed in a map application for accessing street level images along a map.

19. The method of claim 12, further comprising:
    identifying a viewpoint oriented quadrilateral from a spherical image bubble, wherein the two-dimensional image is derived from the viewpoint oriented quadrilateral.

20. A non-transitory computer readable medium including instructions that when executed are operable to:

receive a two-dimensional image associated with a geographic location;
receive three-dimensional location data associated with the geographic location that describes distances to objects depicted in the two-dimensional image;
form a plurality of perspective images from the three-dimensional location data by texturing the three-dimensional location data using color information from the two-dimensional image; and
generate an anaglyph image formed from the plurality of perspective images.

* * * * *